(12) United States Patent
Bauer et al.

(10) Patent No.: US 6,916,069 B2
(45) Date of Patent: Jul. 12, 2005

(54) SEAT

(75) Inventors: Jurgen Bauer, Sulzbach/Murr (DE); Heribert Lischka, Markdorf (DE)

(73) Assignee: Recaro Aircraft Seating GmbH & Co., Schwäbisch Hall (DE)

( * ) Notice: Subject to any disclaimer, the term of this patent is extended or adjusted under 35 U.S.C. 154(b) by 17 days.

(21) Appl. No.: 10/139,650

(22) Filed: May 7, 2002

(65) Prior Publication Data
US 2003/0209924 A1 Nov. 13, 2003

(51) Int. Cl.[7] .............................. A47C 1/02; A47C 20/00
(52) U.S. Cl. .............................. 297/423.3; 297/423.36; 297/83; 297/61
(58) Field of Search .......................... 297/83, 423.3, 297/423.36, 217.3, 61

(56) References Cited

U.S. PATENT DOCUMENTS

| | | | |
|---|---|---|---|
| 4,669,780 A * | 6/1987 | Sakakibara et al. | 297/257 |
| 5,651,587 A | 7/1997 | Kodaverdian | |
| 6,078,854 A * | 6/2000 | Breed et al. | 701/49 |
| 6,255,790 B1 * | 7/2001 | Popp et al. | 318/280 |
| 6,526,643 B1 * | 3/2003 | Renault | 29/407.05 |
| 2002/0003370 A1 * | 1/2002 | Menard | 297/423.36 |
| 2002/0070591 A1 * | 6/2002 | Nivet | 297/217.3 |
| 2002/0105212 A1 * | 8/2002 | Nivet | 297/83 |
| 2002/0109389 A1 * | 8/2002 | Satoh | 297/423.19 |
| 2002/0109390 A1 * | 8/2002 | Hagiike | 297/423.36 |
| 2002/0113476 A1 * | 8/2002 | Enno | 297/330 |
| 2002/0113478 A1 * | 8/2002 | Kasahara | 297/362.11 |
| 2003/0090089 A1 * | 5/2003 | Koerlin et al. | 280/650 |

FOREIGN PATENT DOCUMENTS

DE    19944620    4/2001

* cited by examiner

Primary Examiner—Peter M. Cuomo
Assistant Examiner—Sarah C. Burnham
(74) Attorney, Agent, or Firm—Roylance, Abrams, Berdo & Goodman, L.L.P.

(57) ABSTRACT

A seat, in particular a vehicle seat, preferably an aircraft passenger seat, has seating components such as a sitting part (20), a back rest (22), and a leg rest (24). The positions of these components, particularly their inclination relative to each other, is adjustable by at least one operating device (32), and by a control device (40) with at least one control component, preferably manually actuatable. The control device (40) is provided with at least one function element (48, 50) which makes certain that the control device and/or control component cannot be activated unintentionally. In addition to the control device, such as one in the form of an operating component or operating key, another structural component (function element) is present as a switching component. Operation of the function element in the form of a connection process is necessary to cause activation of the control device for initiation of an operating process. A high degree of safety is attained and inadvertent operating processes cannot occur.

15 Claims, 3 Drawing Sheets

SEAT

FIELD OF THE INVENTION

The present invention relates to a seat, a vehicle seat in particular, and preferably an aircraft passenger seat. Seat components, such as a sitting part, a back rest and a leg rest, have positions which may be adjusted, especially with respect to their inclination relative to each other, by at least one operating device. A control device having at least one control component may be manually actuated.

BACKGROUND OF THE INVENTION

DE-A-199 44 620 discloses an aircraft passenger seat having individual seat components including a leg rest and a back rest. The seat components in question may be moved by operating devices in the form of actuating drives or actuators controlled by a manually operated operating device for adjusting the seat to the requirements of the respective seat occupant. For the seat components, hand levers based on the contours of these seat components are present as a component of the operating device. Levers, combined in one operating device, may effect a clear-cut adjustment for the seat components involved. If, in the case of the conventional solution, the hand of a seat occupant comes in contact with the control panel, an unintended adjustment movement of the seat is possible. Such unintended movement may result in startling of the passenger and may involve some danger to the occupant of the seat.

EP-B-0 774 913 discloses a vehicle or aircraft passenger seat with an electric control operation acting on a leg rest to monitor the position of the leg rest to prevent impact of the foot rest, as an integral part of the leg rest, on the floor. To monitor protection against the impact involved, the electronic control unit monitors both the current position of the footrest and the current position of the leg rest. If this conventional seat is provided with an operating component for actuation, an operating component is provided which communicates with the actuating device by way of a cable connection or the like. Especially when the operating component is laid aside, an inadvertent actuating process may occur, one attended by the disadvantages already described. In addition, the conventional solution is also provided with an individual operating button (magic button) which makes it possible by means of only one operation of this magic button to transfer the seat from any given position to a so-called upright position for takeoff and landing and in an emergency situation, for example, if crashing of the aircraft is to be feared. The single operating button used for this purpose also causes the seat adjustment process described to be carried out in the event of unintentional operation.

SUMMARY OF THE INVENTION

Objects of the present invention are to provide aircraft seats, in particular aircraft passenger seats avoiding the disadvantages from unintended seat adjustment.

Other objects of the present invention are to provide an improved aircraft seat in which unintended seat adjustment movements cannot occur if a control component in the form of the operating component, an operating key, or an operating switch is accidentally actuated.

The foregoing objects are basically provided by a control device with at least one function element which ensures that the control device and/or the control component cannot be activated unintentionally. In addition to the control device proper, for example, one in the form of an operating component or operating key, another component (function element) in the form of a switch element is present. Only actuation of the function element in the form of a connection process is required to cause the control device and/or the control component to initiate an operating process. A high degree of safety is hereby achieved; and inadvertent operating processes cannot occur.

In this instance, the function element is preferably designed as a safety switch (safety button). With the pertinent electric or electronic safety circuitry, it makes certain that unintentional activation of the seat kinematics cannot occur. Only as a result of operation of the safety switch (safety button) are all functions of the switching and control components cleared for an operating process by the seat occupant. If the safety switch has not been operated, the other operating components are blocked from performance of their functions and cannot be switched on.

The safety switch may be present on an operating component itself with the other control components in the form of pushbuttons or the like. Alternatively it could be mounted in another place, as for example, on an arm rest of the aircraft passenger seat, where it can be reached easily by the aircraft passenger or seat occupant. In this way, it would also be possible, by actuating the safety switch with one hand and keeping this switch depressed, to clear the control device which, operated with the other hand, provided with a corresponding operating component to initiate the movement of adjustment for the respective seat elements.

In place of the function element described, as switch or push button, however, the possibility also exists of designing this element as a type of seat occupation detection feature. This would allow the aircraft passenger, once, the seated position has been assumed, to operate the control device and/or the control component (operating component) appropriately for seat adjustment processes.

The function element designed as a safety element may be present singly and in multiples. Consequently, the scope of the present invention includes provision of a first safety switch in a central location, on an arm rest or the like, for example. A switch operation of the first safety switch connects the seat adjustment device. Another safety switch in the form of another function element, such as one mounted on the operating component, can permit an adjustment process by the operating component only when the pertinent second safety switch has been operated once or permanently.

Other objects, advantages and salient features of the present invention will become apparent form the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
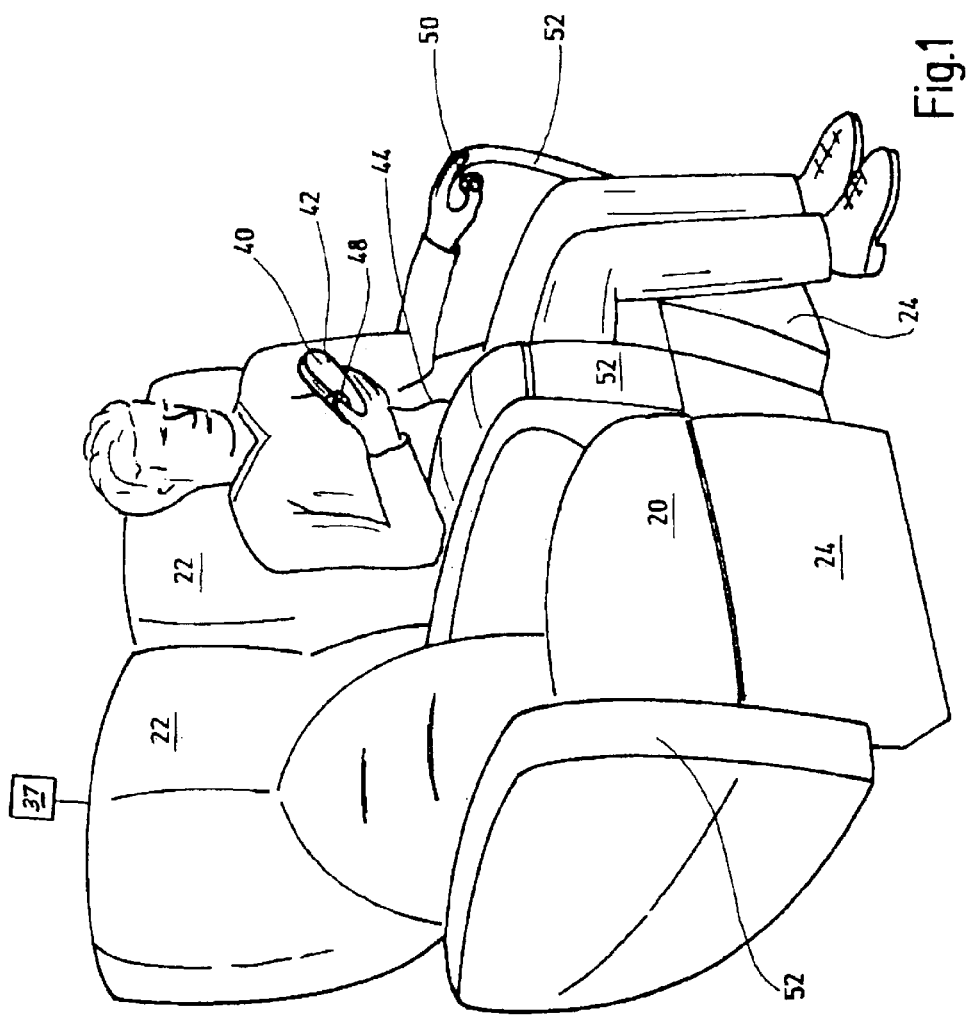
FIG. 1 is a perspective view of two aircraft passenger seats, with the rear aircraft passenger seat as viewed in the line of vision being occupied, according to an embodiment of the present invention.
Figure 2:
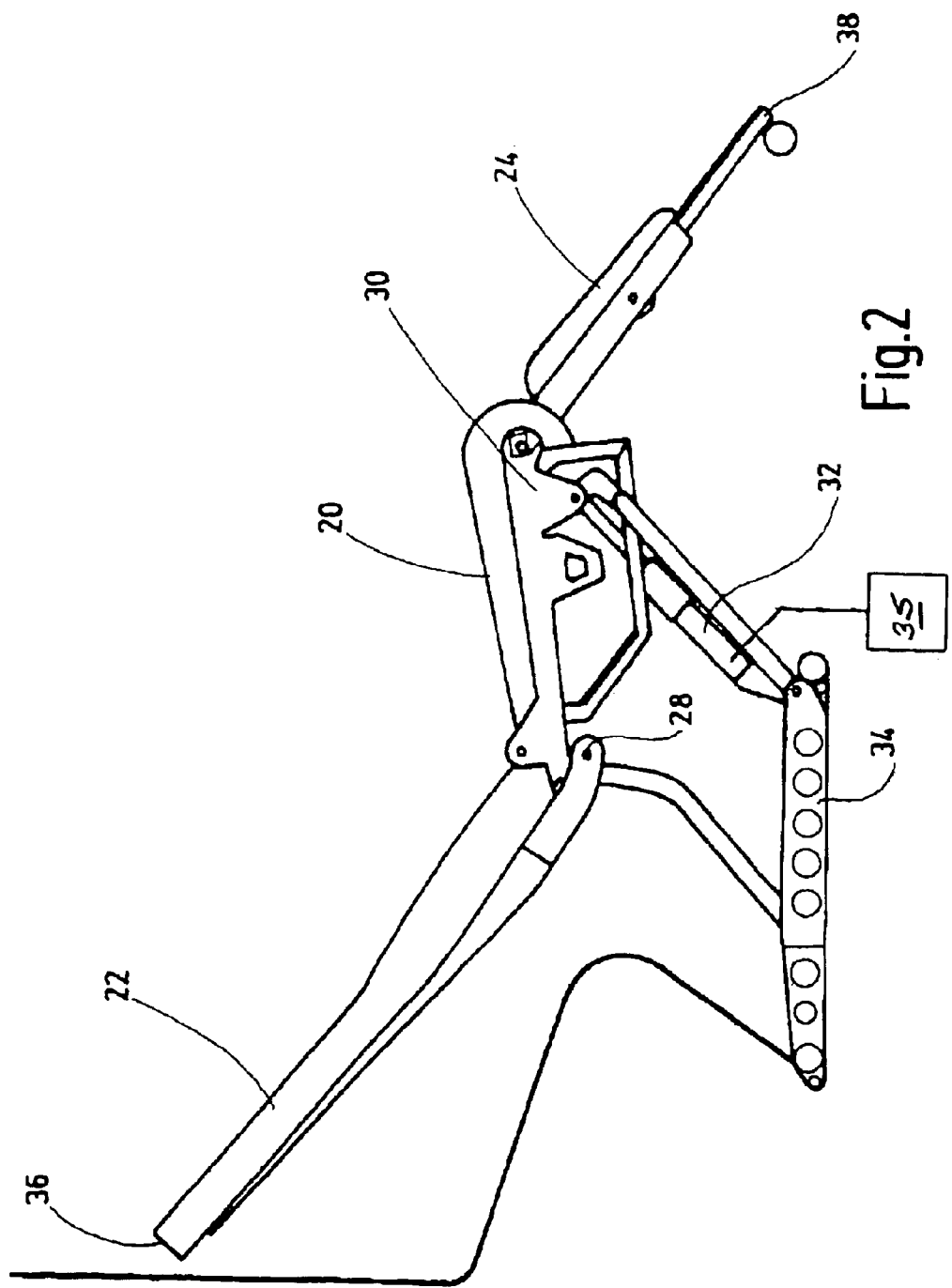
FIG. 2 is a side elevational view of the aircraft passenger seat as shown in FIG. 1, illustrating the basic technical structure of the seat.

FIG. 1 illustrates an aircraft passenger seats in the upright position. Aircraft passenger seats, such as these with the corresponding level of equipment, are often found in the first-class area of long-distance aircraft. However, in principle, they might also be used in extensively equipped coaches or aboard passenger ships, including ferries. The aircraft passenger seat shown in FIG. 1 is preferably a component of a compartment. FIG. 2 illustrates one of the seats spatially separated from the group of seats following in sequence. In principle, however, the aircraft passenger seat can also be used in multiples mounted side by side in sequence in the business class area for a conventional multiple-seat arrangement.

The aircraft passenger seat is made up of individual seat components such as a seat component 20, a back rest 22, and a leg rest 24. In addition, for the sake of better illustration, the padding overlay for the seat components is reproduced only in part in FIG. 2, so that the components of the aircraft passenger seat under the padding are at least partly visible.

The back rest 22 is mounted to be pivotable about a moving joint 28 by a first operating device (not shown) to vary its inclination relative to the seat component 20, extending more or less horizontally in its initial position. The seat component 20 is also pivotable, by a four-hinge frame 30, with an operating device 32 in the form of an actuator. The leg rest 24 may be extended horizontally and is also pivotable in its inclination by a third operating device (not shown). In addition, the seat shown in FIG. 2 is connected by the four-hinge frame 30 to an upright component 34 by means of which the aircraft passenger seat may be localized or secured to the floor of the aircraft.

Actuation of various seat components by means of various operating devices 32 is conventional, so that no more details will be presented at this point. For the seat as a whole, consideration is given to lightweight construction to be able to increase the payload correspondingly. The aircraft passenger seat may also be provided with a monitoring device, such as one in the form of a computer unit including a small process computer or the like. The monitoring device 35 monitors the respective collision justified boundary geometries of the movable seat components 20,22,24 with prescribed three-dimensional limitations to ensure collision-free movement of all seat components within their three-dimensional restrictions by actuation of the respective operating device 32 at any time. The collision justified boundary geometries in this case are the top edge 36 of the back rest 22, optionally with a retractable and extensible head rest 37, and the bottom 38 of the leg rest 24, optionally with the leg rest extension (see FIG. 2). Since each seat component 20,22,24 has an independent operating device 32, provision is made such that the monitoring device detects the positions of each individual operating device in order to obtain mathematical feedback regarding the position of the seat components. Consequently, by dispensing with any movement sensors, cam-operated limit switches, or the like, it is possible also to obtain information by way of the regulating distances of the respective operating device regarding the inclination adjustment angle relative to a reference plane for the seat components. In addition, the monitoring device also permits plausibility testing of the possible positions of the seat components 20,22,24 in order to exclude operating errors and erroneous positioning.

Figure 3:
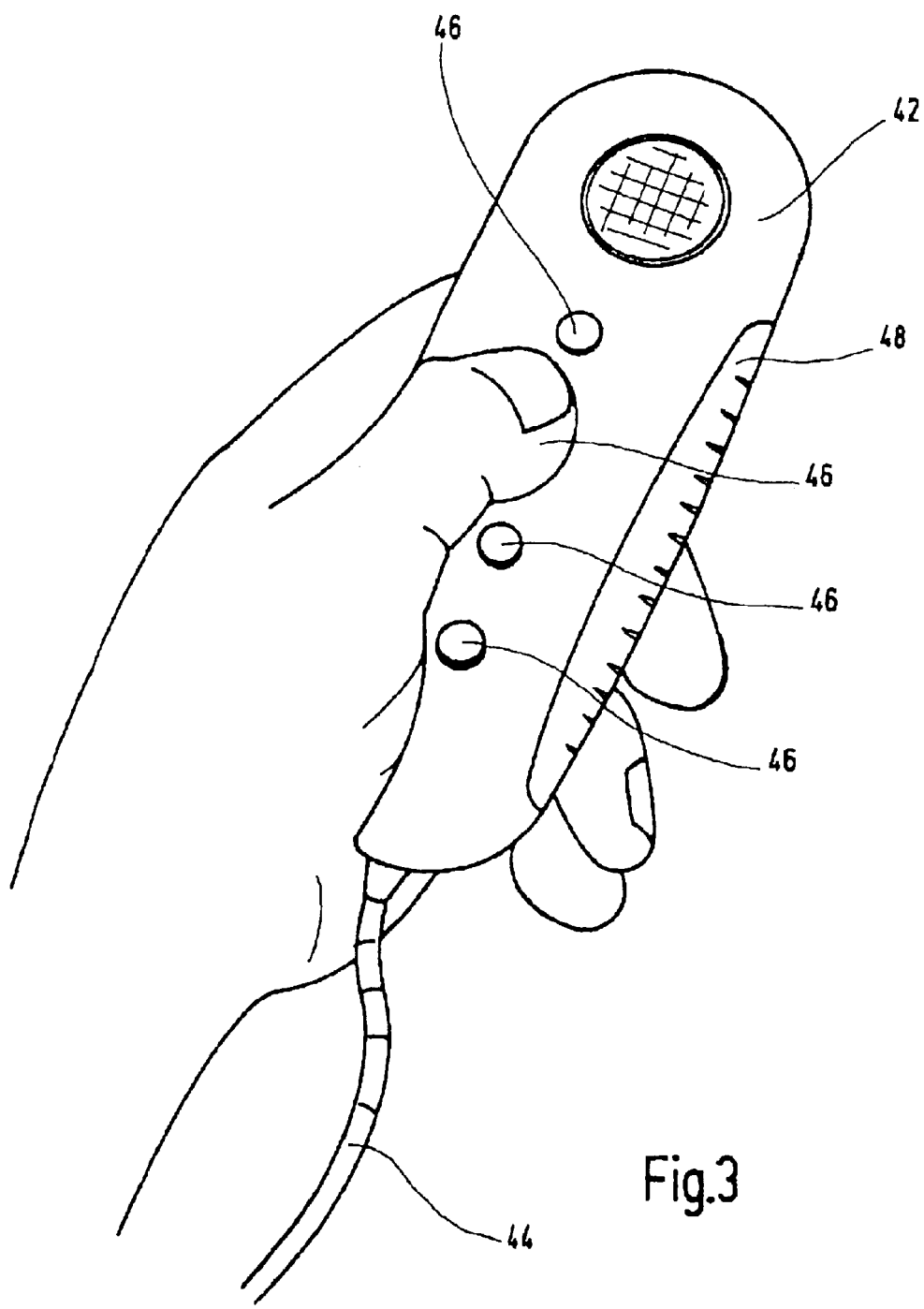
FIG. 3 is a perspective view of a manually actuatable operating component for activation of the seat kinematics for an aircraft passenger seat of FIGS. 1 and 2.

In the embodiment of an aircraft passenger seat shown in the illustrations, a manually operated control device 40 is provided which has, as its control component, an operating component 42. Operating component 12 communicates through a cable connection 44 with the respective monitoring and actuating device for the seat adjustment kinematics. In the case of the embodiment of an operating component 42 shown in FIG. 3, this embodiment has a plurality of operating buttons or switches 46. Each operating button 46 is associated with a specific seat adjustment situation. For example, the uppermost operating button 46 as seen in FIG. 3 could be associated with the seat in its upright position. The lowermost button could correspond to a recumbent position in which more or less all seat components 20, 22, and 24 are positioned virtually horizontally to afford the seat occupant the opportunity to sleep. The two operating buttons 46 situated between the uppermost and lowermost buttons may then be associated with intermediate positions for seat adjustment. A respective intermediate seat position is illustrated in FIG. 2.

In order to make certain now that inadvertent switch actuation by way of the operating component 42 cannot occur, a function component 48 is mounted on the side of the operating component 42. Only after actuation of this function component 48 in the form of a manually operated key can an operating process be initiated by one of the operating switches 46. If the function component 48 cannot be operated by hand, for example, against the force of a return spring in the housing of the operating component 42, for example, the other control or operating switches 46 are locked and seat adjustment movement is not possible. Consequently, a seat occupant cannot inadvertently initiate a seat adjustment movement, even if, for example, he inopportunely lays the operating component 42 aside or inadvertently sits on it or the like.

In addition or as an alternative, as shown in FIG. 1, to the first function element 48, an additional function element 50 can be provided, in this instance in the arm rest. Additional functional element 50 permits activation of a seat adjustment process for the seat as a whole. That is, operation of the additional function element 50, in the form of the operating button in the arm rest 52, causes activation of the operating component 42. A clearcut operating and seat adjustment process can be initiated by the operating component 42, but only after operation of the first function element 48 in the form of the hand key described. In a slimmed-down version of the operating device described, however, it is also possible to replace the first function element 48 with an operating button on the arm rest and to dispense with an additional function key. If the operating person then presses the operating button on the arm rest and keeps it depressed, an adjustment process by the operating component 42 with its operating button 46 becomes possible. An additional function key 50 on the seat may also be replaced by a seat recognition device (not shown) which determines if a seat occupant has occupied the seat to activate thereby the operating component 42, with the option of operating the first function element 48 to effect seat adjustment. The seat occupation detection could also be replaced by yet other detection systems, such as one in the form of a movement sensor, which detects exactly when a person occupies a particular seat.

In any event, the safety device for a seat makes it certain that this seat will not inadvertently carry out an adjustment movement or assume a specific adjustment situation. Only after operation of the safety device (safety button) does intentional adjustment of the seat in accordance with a prescribable adjustment pattern (kinematics) become possible.

While one embodiment has been chosen to illustrate the invention, it will be understood by those skilled in the art that various changes and modifications can be made therein without departing from the scope of the invention as defined in the appended claims.

What is claimed is:

1. A seat, comprising:

a sitting seat part;

a back rest seat part adjustably coupled to said sitting seat part to vary relative positions thereof;

a leg rest seat part adjustably coupled to said sitting seat part to vary relative positions thereof;

an operating device coupled to at least one of said back rest seat part and said leg rest seat part for moving said one of said back rest seat part and said leg rest seat part to different positions relative to said sitting seat part:

a control device with at least one manually operable control component for initiating operation of said operating device; and first and second function elements connected to said control device each of which must be actuated for said control component to initiate operation of said operating device.

2. A seat according to claim 1 wherein each of said function elements are manually actuable, said first function element being mounted to said control device, said second function element being spaced from said control device.

3. A seat according to claim 1 wherein said first and second function elements are located at different and spaced locations.

4. A seat according to claim 1 wherein said first and second function elements are electrical switches.

5. A seat according to claim 1 wherein a monitoring device is coupled to said operating device to monitor collision justifying boundaries of said seat parts with prescribed spatial limitations, said monitoring device ensuring collision-free movement of said seat parts within the spatial limitations by actuating said operating device at any point in time.

6. A seat according to claim 5 wherein each seat part has an independent operating device with positions thereof registered by said monitoring device.

7. A seat according to claim 6 wherein said back rest seat part and said leg rest seat part are angularly adjustable relative to said sitting seat part; and inclination angles of said seat parts relative to a reference angle is registered from regulatory distances of the respective operating device.

8. A seat according to claim 1 wherein said back rest seat part comprises a retractable and extendible head rest; and said leg rest comprises a retractable and extensible extension.

9. A seat according to claim 1 wherein an upper edge of said back rest seat part and a lower edge of said leg rest seat part are employed as collision justifying boundary geometrics.

10. A seat according to claim 5 wherein said monitoring device performs plausibly testing of different portions of said seat parts to prevent operating and positioning errors.

11. A seat according to claim 1 wherein said first function element determines presence of a seat occupant.

12. A seat according to claim 1 which said first function element is an operating switch mounted on a central operating component.

13. A seat according to claim 1 wherein said second function element is mounted on an arm rest of the seat.

14. A seat according to claim 13 wherein said control component comprises a plurality of push buttons with each of said push buttons being associated with a seat adjustment of said seat parts in a prescribable sequence.

15. A seat according to claim 3 wherein said control component comprises a plurality of push buttons with each of said push buttons being associated with a seat adjustment of said seat parts in a prescribable sequence.

* * * * *